(12) United States Patent
Cui et al.

(10) Patent No.: US 11,064,567 B2
(45) Date of Patent: Jul. 13, 2021

(54) METHODS TO ADAPT A FREQUENCY DENSITY OF CHANNEL STATE INFORMATION REFERENCE SIGNAL (CSI-RS) RESOURCES FOR BEAM FAILURE DETECTION (BFD) IN NEW RADIO (NR) SYSTEMS

(71) Applicant: Apple Inc., Cupertino, CA (US)

(72) Inventors: Jie Cui, Santa Clara, CA (US); Yang Tang, San Jose, CA (US); Zhibin Yu, Unterhaching (DE)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 16/422,065

(22) Filed: May 24, 2019

(65) Prior Publication Data

US 2019/0281660 A1   Sep. 12, 2019

Related U.S. Application Data

(60) Provisional application No. 62/676,204, filed on May 24, 2018.

(51) Int. Cl.
| | |
|---|---|
| *H04W 88/06* | (2009.01) |
| *H04B 7/08* | (2006.01) |
| *H04L 1/00* | (2006.01) |
| *H04L 5/00* | (2006.01) |
| *H04W 72/04* | (2009.01) |
| *H04L 1/20* | (2006.01) |

(Continued)

(52) U.S. Cl.
CPC ......... *H04W 88/06* (2013.01); *H04B 7/0695* (2013.01); *H04B 7/088* (2013.01); *H04L 1/0026* (2013.01); *H04L 1/203* (2013.01); *H04L 5/0051* (2013.01); *H04L 5/0094* (2013.01); *H04W 72/042* (2013.01); *H04W 72/046* (2013.01); *H04W 76/28* (2018.02)

(58) Field of Classification Search
CPC . H04W 88/06; H04W 72/046; H04W 72/042; H04W 76/28; H04B 7/0695; H04B 7/088; H04L 1/0026; H04L 5/0051; H04L 5/0094; H04L 1/203
See application file for complete search history.

(56) References Cited

U.S. PATENT DOCUMENTS

| | | | |
|---|---|---|---|
| 2018/0091267 A1* | 3/2018 | Kim | H04L 27/2602 |
| 2018/0278310 A1* | 9/2018 | Lee | H04B 7/0617 |
| 2019/0296877 A1* | 9/2019 | Zhang | H04W 72/042 |

* cited by examiner

*Primary Examiner* — Thinh D Tran
(74) *Attorney, Agent, or Firm* — Kowert Hood Munyon Rankin and Goetzel PC

(57) ABSTRACT

Embodiments of a User Equipment (UE), Next Generation Node-B (gNB) and methods of communication are generally described herein. The UE may receive configuration information to configure the UE with a plurality of channel state information reference signal (CSI-RS) resource sets. One of the CSI-RS resource sets may be allocated for beam failure detection (BFD). The UE may determine, based on a subcarrier spacing (SCS) of a bandwidth part (BWP), a frequency density of the CSI-RS resources in the BWP in terms of a number of resource elements (REs) per resource block (RB). The UE may determine, based on the frequency density of the CSI-RS resources, an evaluation period for CSI-RS based BFD, wherein the evaluation period is longer for higher frequency densities and the evaluation period is shorter for lower frequency densities.

20 Claims, 10 Drawing Sheets

(51) Int. Cl.
*H04W 76/28* (2018.01)
*H04B 7/06* (2006.01)

METHODS TO ADAPT A FREQUENCY DENSITY OF CHANNEL STATE INFORMATION REFERENCE SIGNAL (CSI-RS) RESOURCES FOR BEAM FAILURE DETECTION (BFD) IN NEW RADIO (NR) SYSTEMS

PRIORITY CLAIM

This application claims priority under 35 USC 119(e) to U.S. Provisional Patent Application Ser. No. 62/676,204, filed May 24, 2018, which is incorporated herein by reference in its entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to channel state information reference signal (CSI-RS) and adaptation of CSI-RS frequency densities.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
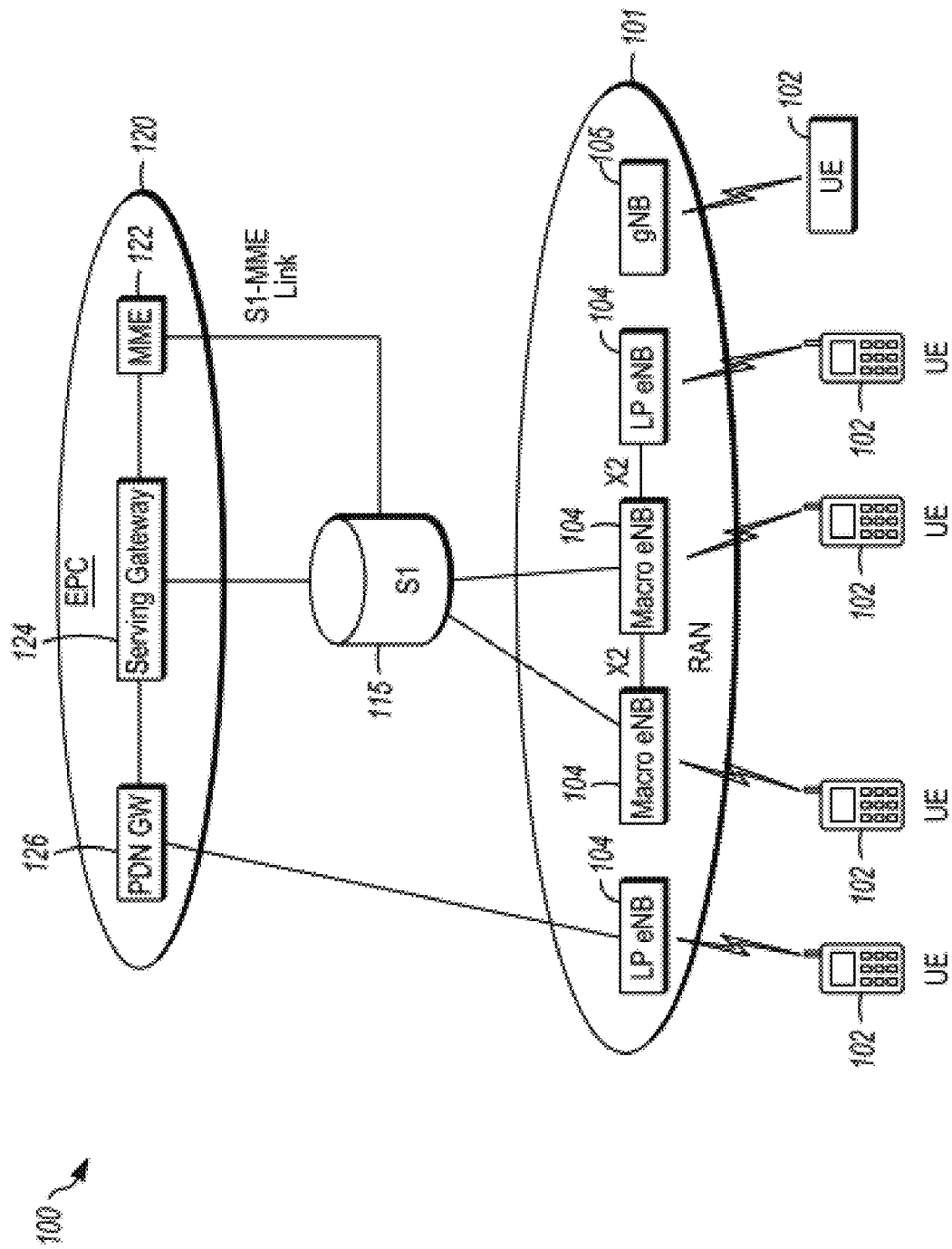
FIG. 1A is a functional diagram of an example network in accordance with some embodiments.
Figure 1B:
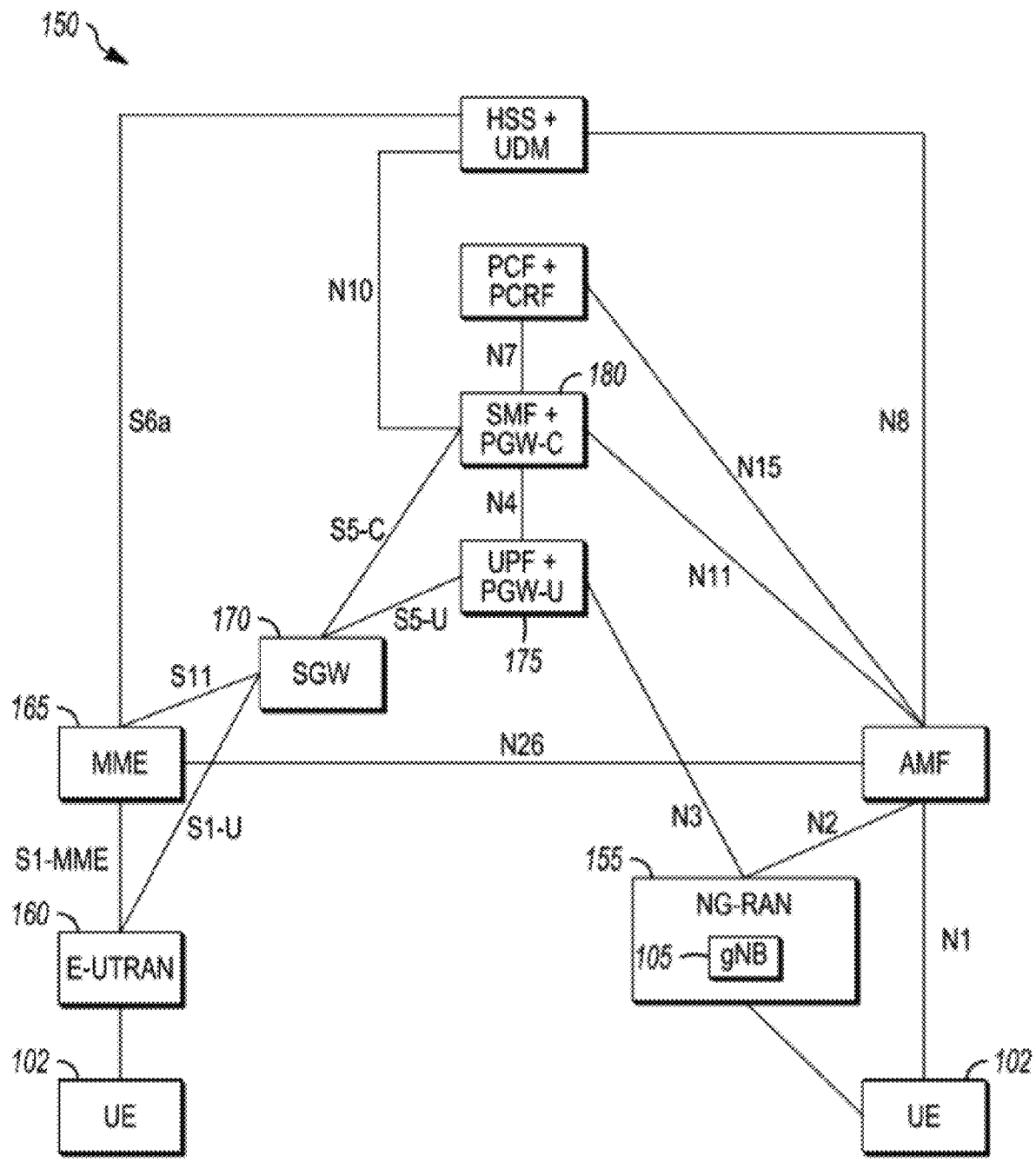
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
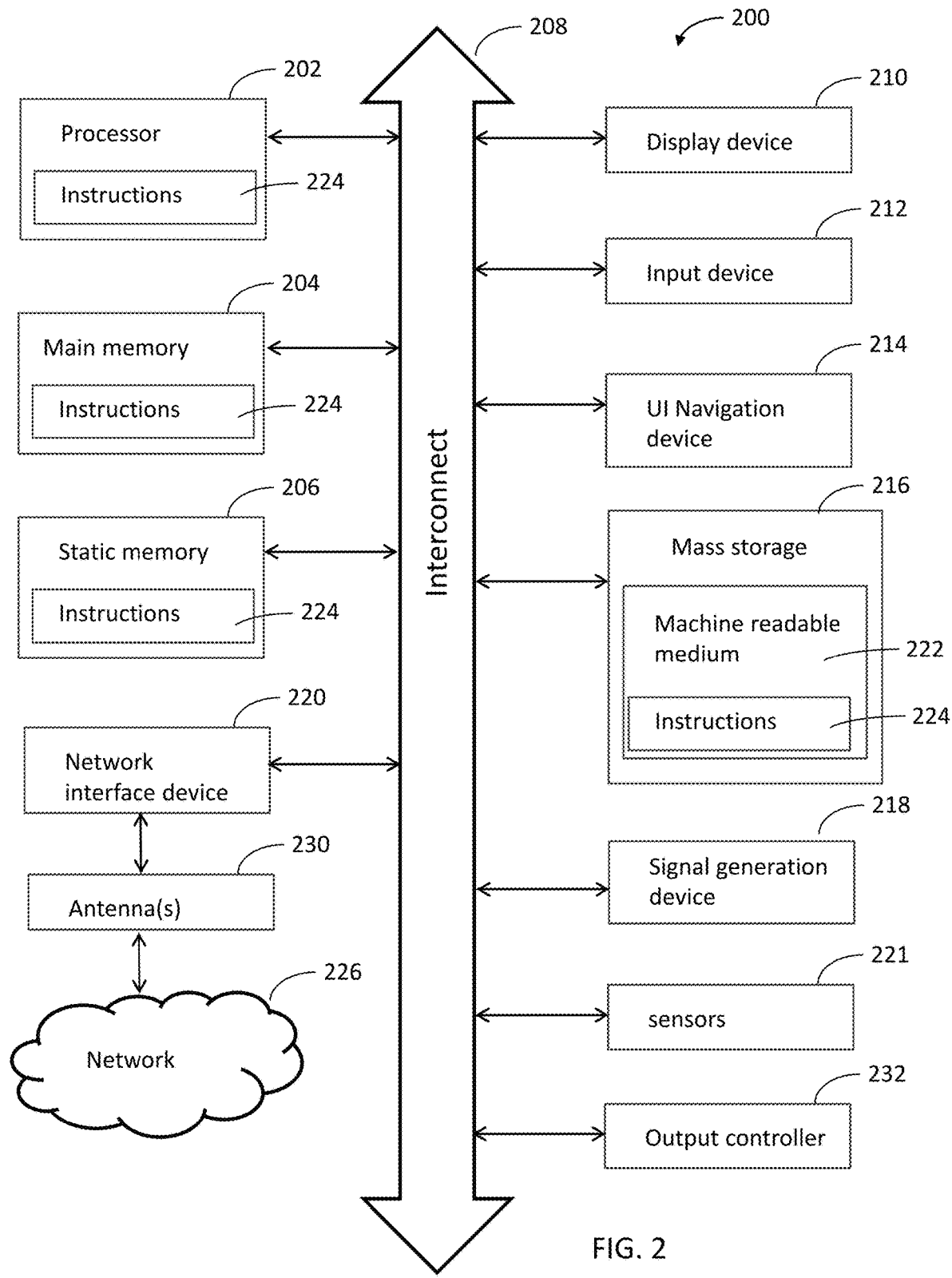
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
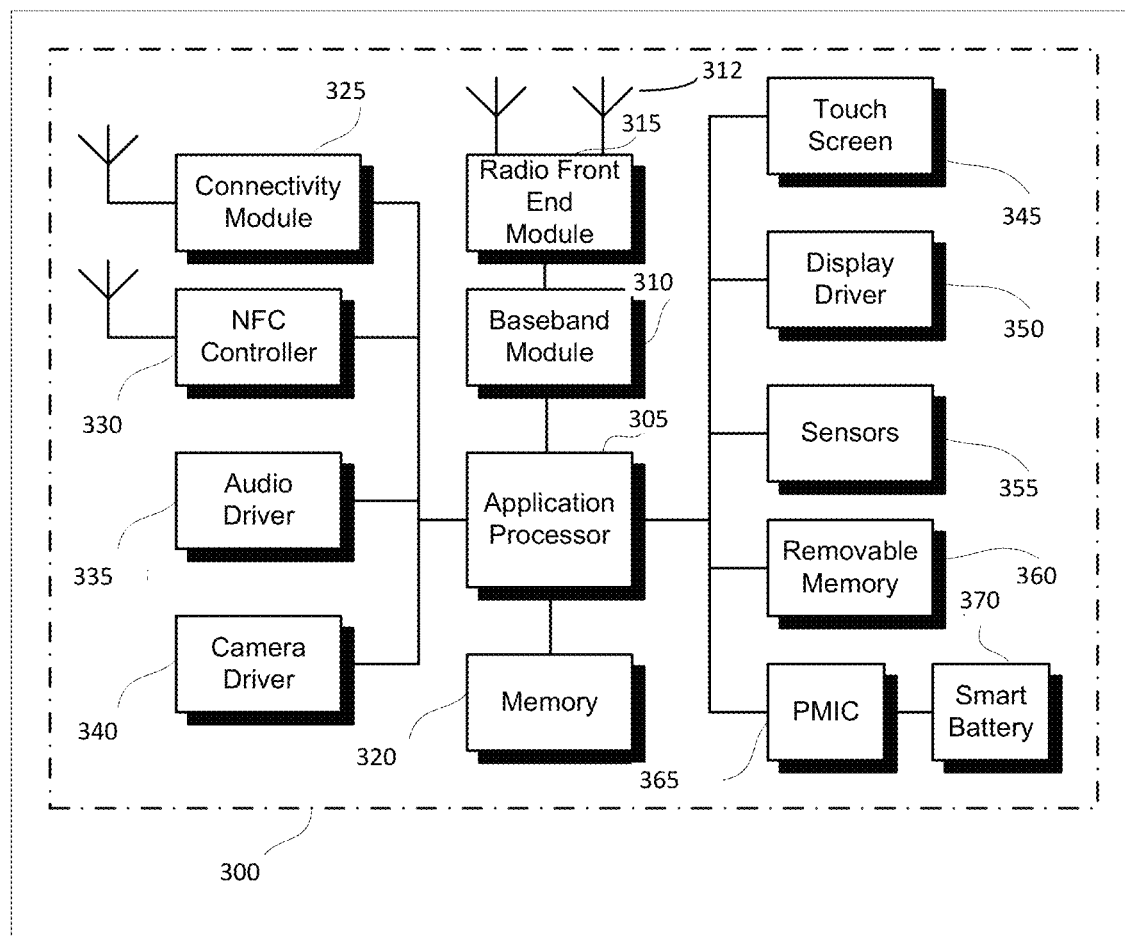
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
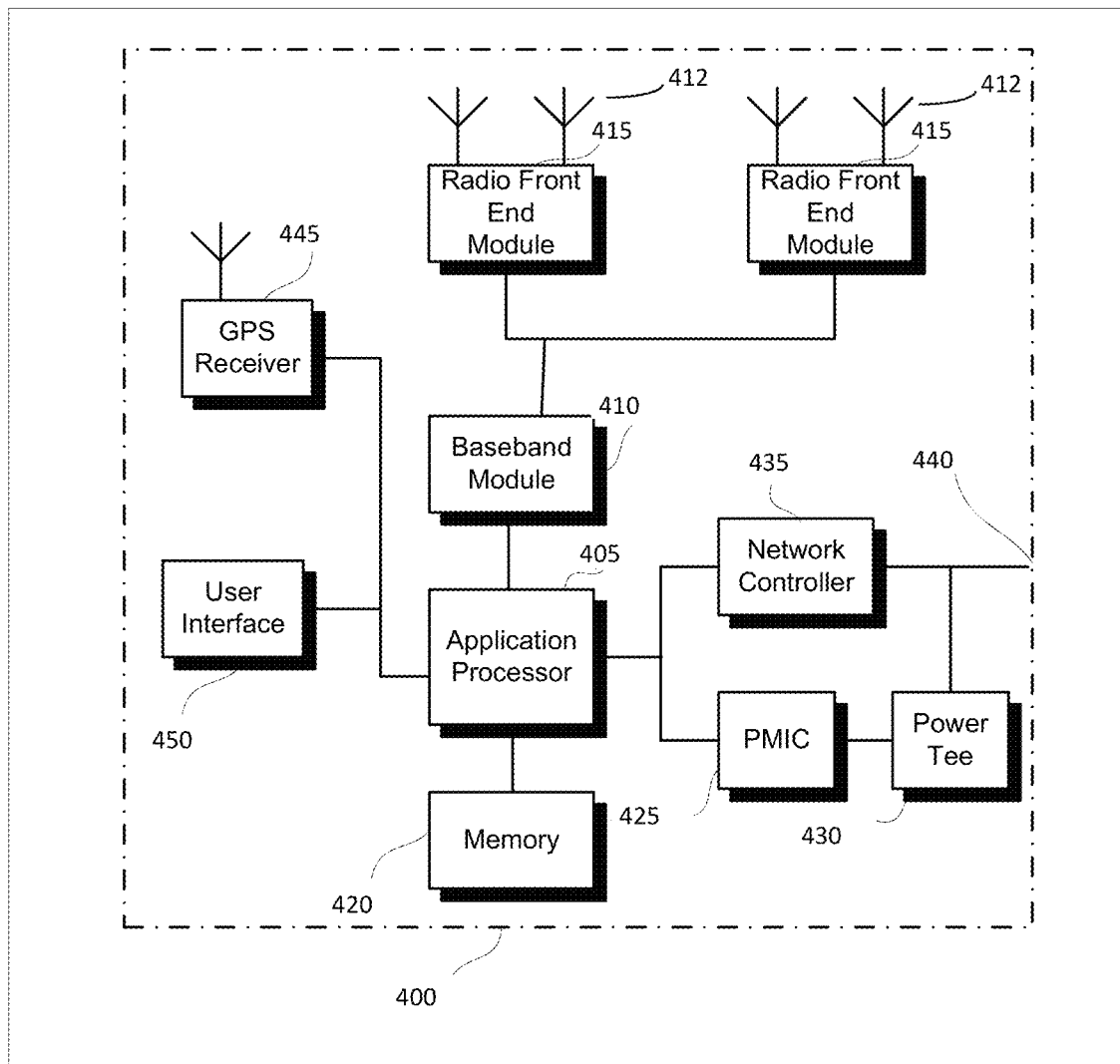
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
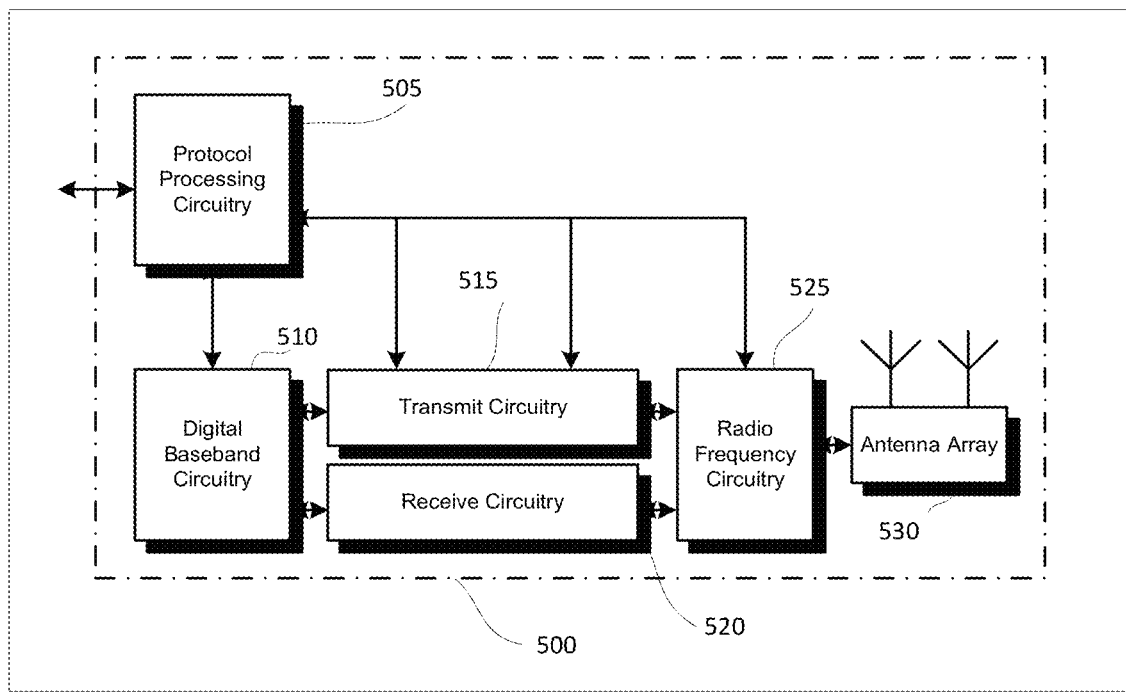
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
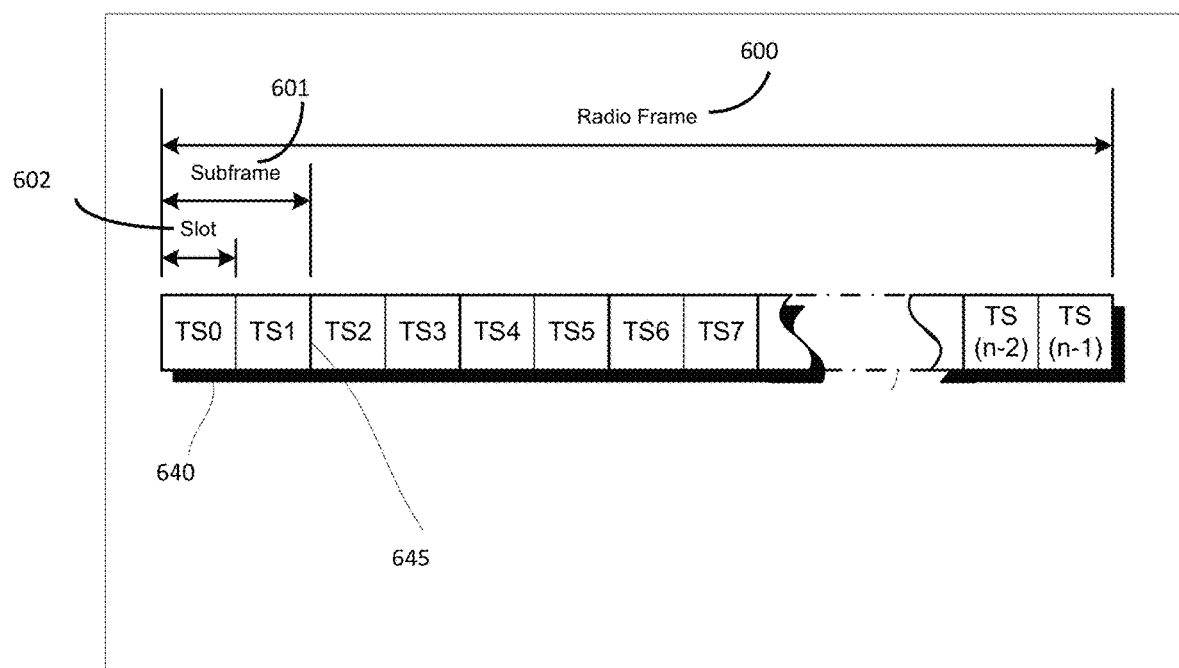
FIG. 6 illustrates an example of a radio frame structure in accordance with some embodiments.
Figures 7A, 7B:
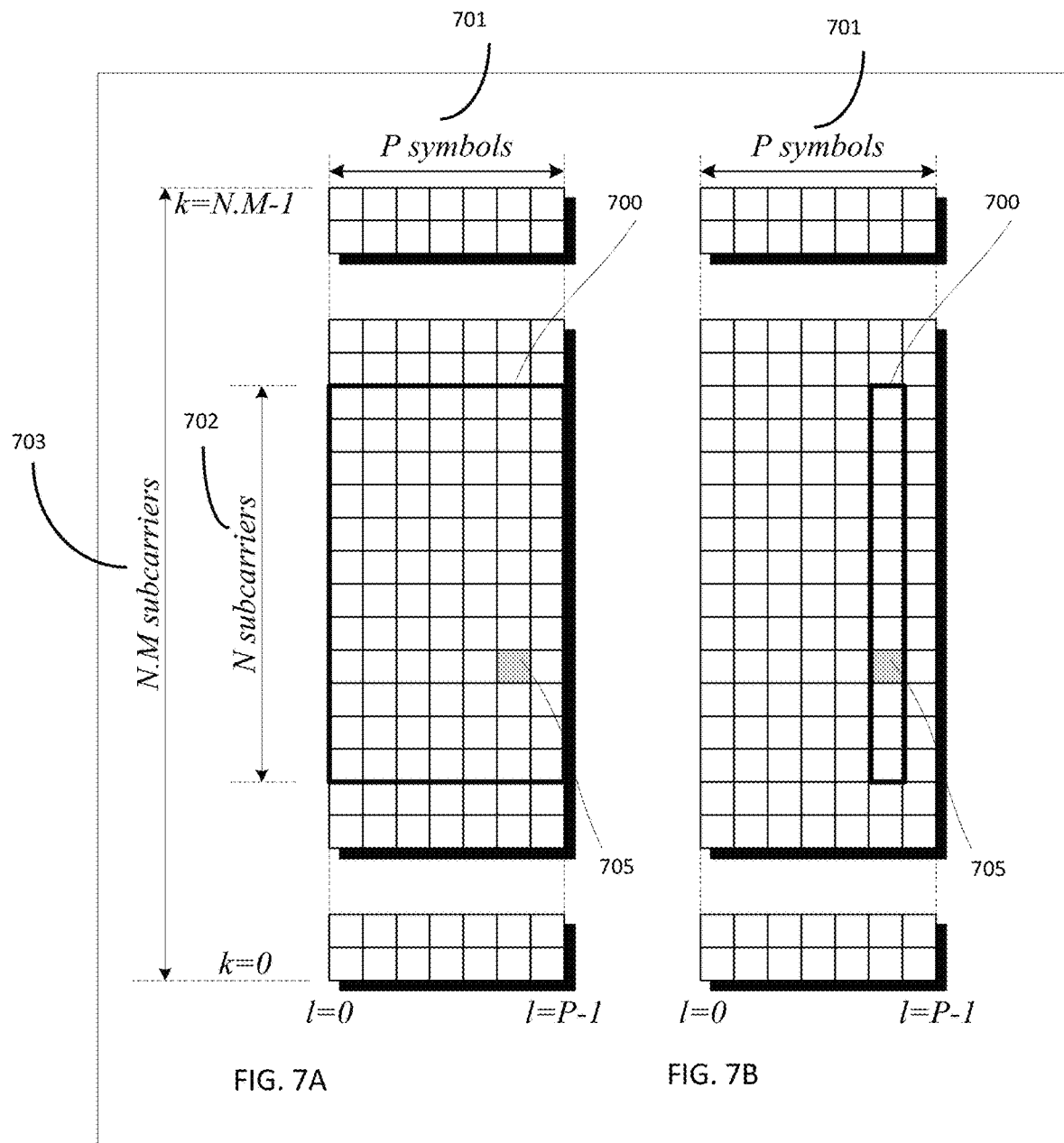
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, a UE 102 may decode configuration information to configure the UE 102 with a plurality of channel state information reference signal (CSI-RS) resource sets. Each CSI-RS resource set may include a plurality of CSI-RS resources. One of the CSI-RS resource sets may be allocated for beam failure detection (BFD). The UE 102 may determine, based on a sub-carrier spacing (SCS) of a bandwidth part (BWP), a frequency density of the CSI-RS resources in the BWP in terms of a number of resource elements (REs) per resource block (RB). The UE 102 may determine, based on the frequency density of the CSI-RS resources, an evaluation period for CSI-RS based BFD, wherein the evaluation period is longer for higher frequency densities and the evaluation period is shorter for lower frequency densities. The UE 102 may perform the CSI-RS based BFD, wherein the UE 102 may: determine a downlink radio link quality over a time period based on reception of CSI-RSs in the CSI-RS resource set allocated for the CSI based BFD during the evaluation period; and determine that a beam failure has occurred if the downlink radio quality over the time period becomes worse than a threshold. The UE 102 may transmit, to a gNB 105, control signaling that indicates that the beam failure has occurred. These embodiments are described in more detail below.

Figure 8:
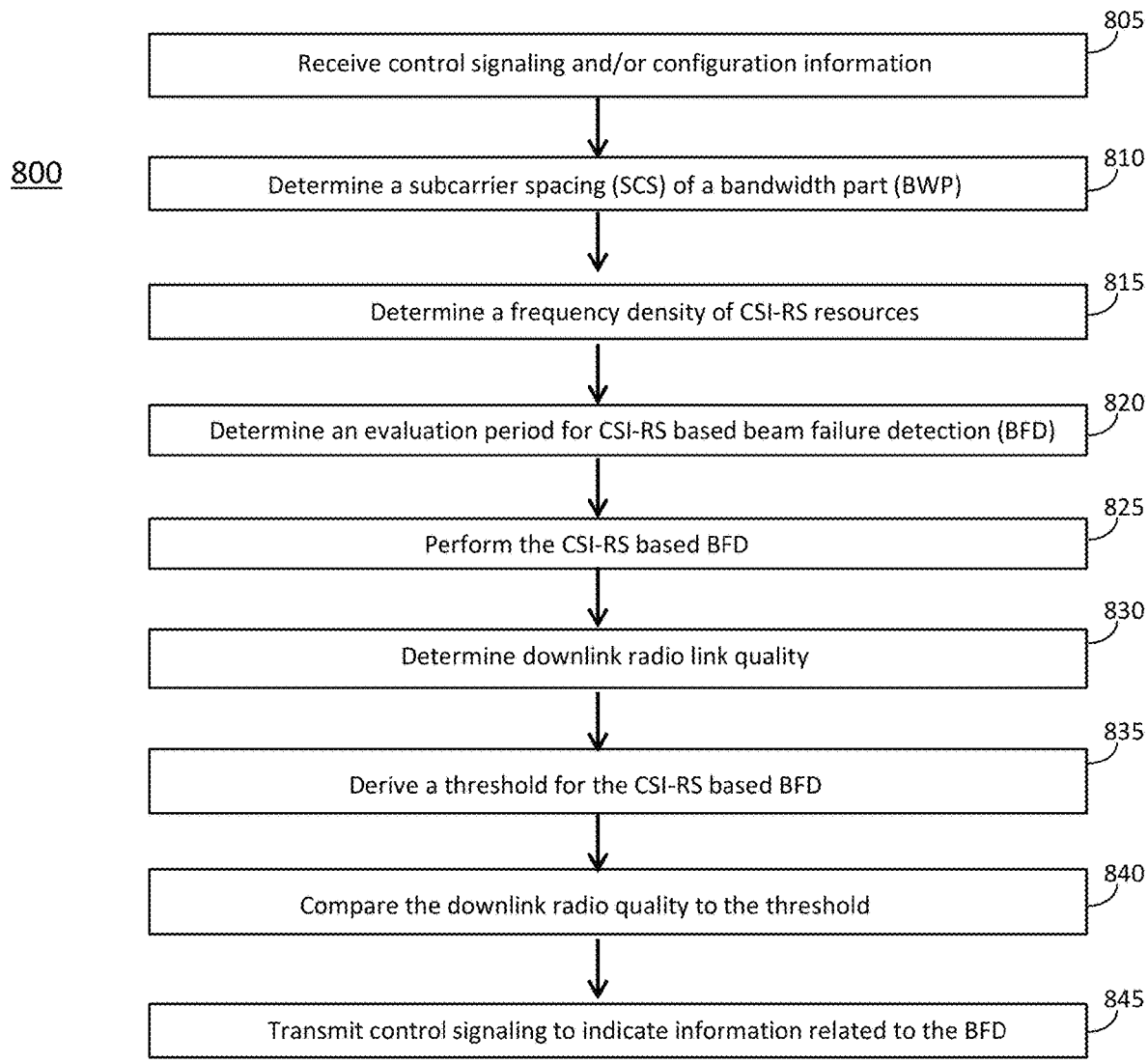
FIG. 8 illustrates the operation of a method of communication in accordance with some embodiments.
Figure 9:
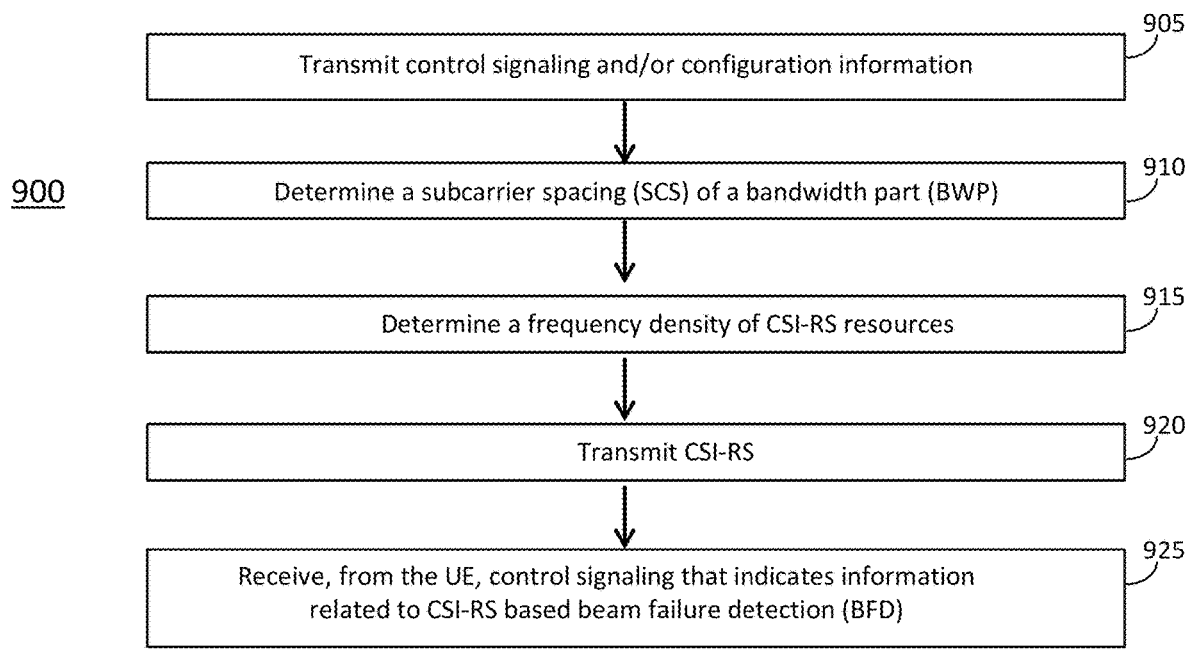
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 900, in some embodiments. In another non-limiting example, the eNB 104 may perform an operation that may be the same as, similar to, reciprocal to and/or related to an operation of the method 900, in some embodiments It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various operations, techniques and/or concepts regarding one of the methods 800, 900 and/or other method may be applicable to one of the other methods, although the scope of embodiments is not limited in this respect. Such operations, techniques and/or concepts may be related to CSI-RS, CSI-RS resource sets, CSI-RS based BFD, SCS, frequency density, evaluation period of the CSI-RS based BFD and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to usage of those elements, however. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102 may be arranged to operate in accordance with an NR protocol. In some embodiments, the gNB 105 may be arranged to operate in accordance with an NR protocol.

At operation 805, the UE 102 may receive control signaling and/or configuration information. In some embodiments, the control signaling and/or configuration information may be related (at least partly) to one or more of the following: channel state information reference signals (CSI-RSs), CSI-RS resource sets, subcarrier spacing (SCS), beam failure detection (BFD), beam IDs, CSI-RS based BFD and/or other.

In some embodiments, the UE 102 may receive configuration information to configure the UE 102 with a plurality of CSI-RS resource sets. In some embodiments, each CSI-RS resource set may include a plurality of CSI-RS resources. In some embodiments, one of the CSI-RS resource sets may be allocated for CSI-RS based BFD.

At operation 810, the UE 102 may determine a subcarrier spacing (SCS) of a bandwidth part (BWP). In some embodiments, the SCS of the BWP may be preconfigured. In some embodiments, the UE 102 may receive control signaling from the gNB 105 that indicates the SCS of the BWP. In some embodiments, different values of the SCS may be used in different frequency ranges. In a non-limiting example, if the BWP is in a sub-6 GHz frequency band, the SCS of the BWP may be one of: 15, 30, and 60 kHz; and if the BWP is in an mmWave frequency band, the SCS of the BWP may be one of: 60, 120, and 240 kHz. Other values may be used, in some embodiments.

At operation 815, the UE 102 may determine a frequency density of CSI-RS resources. In some embodiments, the UE 102 may determine the frequency density of the CSI-RS resources based at least partly on the SCS of the BWP. In some embodiments, the UE 102 may determine the frequency density based on one or more of: whether the BWP is in a sub-6 GHz frequency band or in an mmWave frequency band; the SCS; and/or other parameter(s). In some embodiments, the UE 102 may determine the frequency density based on one or more of: whether the BWP is in a sub-6 GHz frequency band or in an mmWave frequency band; the SCS (which may depend on whether the BWP is in a sub-6 GHz frequency band or in an mmWave frequency band); and/or other parameter(s).

In some embodiments, the UE 102 may determine the frequency density of the CSI-RS resources based on a non-decreasing relationship with the SCS, wherein when a first SCS is greater than a second SCS, a first frequency density for the first SCS is greater than or equal to a second frequency density for the second SCS.

In some embodiments, the UE 102 may determine the frequency density of the CSI-RS resources in terms of a number of resource elements (REs) per resource block (RB), although the scope of embodiments is not limited in this respect. In a non-limiting example, the UE 102 may determine the frequency density of the CSI-RS resources as one of: one RE per RB, and three REs per RB (for instance, a parameter D={1, 3}). Other values may be used, in some embodiments.

In some embodiments, the UE 102 may determine the frequency density of the CSI-RS resources based at least partly on whether the BWP is in a sub-6 GHz frequency band or in an mmWave frequency band. In some embodiments, the UE 102 may determine the frequency density of the CSI-RS resources based at least partly on one or more of: the SCS; whether the BWP is in a sub-6 GHz frequency band or in an mmWave frequency band; and/or other.

In some embodiments, if the BWP is in a sub-6 GHz frequency band, the UE 102 may determine the frequency density of the CSI-RS resources based on a first predetermined mapping between the frequency density of the CSI-RS resources and the SCS of the BWP. If the BWP is in an mmWave frequency band, the UE 102 may determine the frequency density of the CSI-RS resources based on a second predetermined mapping between the frequency density of the CSI-RS resources and the SCS of the BWP.

In a non-limiting example, for the first predetermined mapping: a value of 15 kHz for the SCS of the BWP may correspond to a frequency density of one RE per RB; a value of 30 kHz for the SCS of the BWP may correspond to a frequency density of three REs per RB; and a value of 60 kHz for the SCS of the BWP may correspond to a frequency density of three REs per RB. For the second predetermined mapping: a value of 60 kHz for the SCS of the BWP may correspond to a frequency density of one RE per RB; a value of 120 kHz for the SCS of the BWP may correspond to a frequency density of one RE per RB; and a value of 240 kHz for the SCS of the BWP may correspond to a frequency density of three REs per RB. Embodiments are not limited to the values above, as other values may be used in some embodiments.

At operation 820, the UE 102 may determine an evaluation period for the CSI-RS based BFD. In some embodiments, the UE 102 may determine the evaluation period based at least partly on the frequency density of the CSI-RS resources. In some embodiments, the evaluation period may be longer for higher frequency densities and the evaluation period may be shorter for lower frequency densities. In some embodiments, the UE 102 may adapt/determine the evaluation period to enable an increase in a number of measurements of the downlink radio quality when the frequency density of the CSI-RS resources decreases or when the SCS increases.

In some embodiments, the UE 102 may determine, based on the frequency density of the CSI-RSs, an evaluation period for the CSI-RS based BFD. In some embodiments, the UE 102 may adapt the evaluation period to enable an increase in a number of measurements of the downlink radio quality when a frequency density of the CSI-RSs decreases or when the SCS increases.

At operation 825, the UE 102 may perform CSI-RS based beam failure detection (BFD). In some embodiments, one or more operations (such as 830-840 and/or other(s)) may be performed as part of the CSI-RS based BFD. The scope of embodiments is not limited to performance of those operations as part of the CSI-RS based BFD. In some embodiments, one or more of those operations (830-840 and/or other(s)) may be performed, and may not necessarily be performed as part of the CSI-RS based BFD.

At operation 830, the UE 102 may determine downlink radio link quality. At operation 835, the UE 102 may derive a threshold for the CSI-RS based BFD. At operation 840, the UE 102 may compare the downlink radio quality to the threshold.

In some embodiments, the UE 102 may determine the downlink radio link quality over a time period based on reception of CSI-RSs in the CSI-RS resource set allocated for the CSI based BFD during the evaluation period. The UE 102 may determine that a beam failure has occurred if the downlink radio quality over the time period becomes worse than a threshold.

In some embodiments, the threshold may be based on a value of the downlink radio quality for unreliable reception that corresponds to a target block error rate (BLER) for a hypothetical physical downlink control channel (PDCCH) transmission. In some embodiments, the UE 102 may derive the threshold based on one or more parameters of the hypothetical PDCCH transmission that includes one or more of: a value of downlink control information (DCI) format equal to 0 or 1; a ratio of hypothetical PDCCH resource element (RE) energy to average CSI-RS RE energy equal to 0 dB; a value of SCS equal to the SCS of the BWP; and/or other.

Embodiments are not limited to the above techniques/parameters for determination of the threshold. Other techniques, other values of the BLER and/or other information may be used, in some embodiments.

In some embodiments, the UE 102 may determine (as part of the CSI based BFD or otherwise), which of the beams has failed based on the received CSI-RSs and/or beam identifiers. In some embodiments, the configuration information may indicate one or more beam identifiers for multiple beams for the CSI-RSs, although the scope of embodiments is not limited in this respect.

In some embodiments, the UE 102 may determine an M-BFD parameter based on the frequency density of the CSI-RS resources. In a non-limiting example, the UE 102 may determine the M-BFD parameter as 10 when the frequency density of the CSI-RS resources is three REs per RB. The UE 102 may determine the evaluation period based on one or more of: the frequency density of the CSI-RS resources; the M-BFD parameter; whether the BWP is in a sub-6 GHz frequency band or in a millimeter wave (mm-Wave) frequency band; a periodicity of the CSI-RS resources; whether discontinuous reception (DRX) is configured; a DRX duty cycle; and/or other.

In a non-limiting example, if the BWP is in a sub-6 GHz frequency band, the UE 102 may determine the evaluation period as: 1) if the DRX is not configured, a maximum of: 50 milliseconds (msec); and a product of the M-BFD parameter, a P parameter and the periodicity of the CSI-RS resources, 2) if the DRX is configured, and if the DRX cycle is less than or equal to 320 msec, a maximum of: 50 msec; and a product of 1.5, the M-BFD parameter, the P parameter, and another term, wherein the other term is equal to a maximum of: the DRX cycle and the periodicity of the CSI-RS resources, 3) if the DRX is configured, and if the DRX cycle is greater than 320 msec: a product of the M-BFD parameter, the P parameter, and the DRX cycle. In some embodiments, the M-BFD parameter, the P parameter and/or other parameters may be included in a 3GPP standard. In some embodiments, the M-BFD parameter, the P parameter and/or other parameters may be determined based on techniques included in a 3GPP standard.

Continuing the example, if the BWP is in an mmWave frequency band, the UE 102 may determine the evaluation period as: 1) if the DRX is not configured, a maximum of: 50 milliseconds (msec); and a product of the M-BFD parameter, a P parameter, an N parameter, and the periodicity of the CSI-RS resources, 2) if the DRX is configured, and if the DRX cycle is less than or equal to 320 msec, a maximum of: 50 msec; and a product of 1.5, the M-BFD parameter, the P parameter, the N parameter, and another term, wherein the other term is equal to a maximum of: the DRX cycle and the periodicity of the CSI-RS resources, 3) if the DRX is configured, and if the DRX cycle is greater than 320 msec: a product of the M-BFD parameter, the P parameter, the N parameter and the DRX cycle. In some embodiments, the M-BFD parameter, the P parameter and/or other parameters may be included in a 3GPP standard. In some embodiments, the M-BFD parameter, the P parameter and/or other parameters may be determined based on techniques included in a 3GPP standard.

In some embodiments, when the frequency density of the CSI-RS resources is a value other than three REs per RB (including but not limited to one RE per RB), the UE 102 may determine the evaluation period. In comparison to the above case in which the frequency density of the CSI-RS resources is three REs per RB, the UE 102 may use one or more of: a different technique; a similar technique; a same technique and/or similar technique using one or more different values of one or more parameters (such as the M-BFD parameter, P parameter, N parameter and/or other(s)) than the values used for the case in which the frequency density of the CSI-RS resources is three REs per RB; different logic; same logic and/or similar logic; and/or other. In addition, in some embodiments, the UE 102 may use any suitable technique/operation(s) to determine the evaluation period for cases in which the frequency density of the CSI-RS resources is a value other than three REs per RB.

At operation 845, the UE 102 may transmit control signaling to indicate information related to the BFD. For instance, the UE 102 may transmit control signaling to indicate one or more of: that beam failure had occurred; whether beam failure had occurred; which beam(s) had failed; one or more beam IDs; and/or other.

In some embodiments, an apparatus of a UE 102 may comprise memory. The memory may be configurable to store information related to the frequency density of the CSI-RS resources and the evaluation period. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding the configuration information. The apparatus may include a transceiver to receive the configuration information. The transceiver may transmit and/or receive other blocks, messages and/or other elements.

At operation 905, the gNB 105 may transmit control signaling and/or configuration information. At operation 910, the gNB 105 may determine an SCS of a BWP. At operation 915 the gNB 105 may determine a frequency density of CSI-RS resources. At operation 920, the gNB 105 may transmit CSI-RS. In some embodiments, the gNB 105 may transmit the CSI-RS in accordance with the SCS of the BWP; the frequency density of CSI-RS resources; and/or other. At operation 925, the gNB 105 may receive, from the UE 102, control signaling that indicates information related to CSI-RS based beam failure detection (BFD).

In some embodiments, the gNB 105 may determine a frequency density of CSI-RSs to be transmitted in a BWP. In some embodiments, the frequency density of the CSI-RSs may be adapted based on a configurable SCS for the BWP. In some embodiments, the gNB 105 may, if the BWP is in a sub-6 GHz frequency band, determine the frequency density of the CSI-RSs based on a non-decreasing first mapping between the frequency density of the CSI-RSs and the SCS of the BWP; and if the BWP is in a sub-6 GHz frequency band, determine the frequency density of the CSI-RSs based on a non-decreasing second mapping between the frequency density of the CSI-RSs and the SCS of the BWP. In some embodiments, the gNB 105 may transmit the CSI-RSs in accordance with the determined frequency density of the CSI-RSs.

In some embodiments, the gNB 105 may, if the BWP is in a sub-6 GHz frequency band, configure the SCS of the BWP as one of: 15, 30, and 60 kHz; and if the BWP is in an mmWave frequency band, configure the SCS of the BWP as one of: 60, 120, and 240 kHz.

In some embodiments, the gNB 105 may determine the frequency density of the CSI-RSs in terms of a number of resource elements (REs) per resource block (RB). In a non-limiting example, for the first mapping: a value of 15 kHz may correspond to a frequency density of one RE per RB; a value of 30 kHz for the SCS of the BWP may correspond to a frequency density of three REs per RB; and a value of 60 kHz for the SCS of the BWP may correspond to a frequency density of three REs per RB. Continuing the example, for the second mapping: a value of 60 kHz for the SCS of the BWP may correspond to a frequency density of one RE per RB; a value of 120 kHz for the SCS of the BWP may correspond to a frequency density of one RE per RB; and a value of 240 kHz for the SCS of the BWP may correspond to a frequency density of three REs per RB. Embodiments are not limited to the above example numbers/values. Other numbers/values may be used, in some embodiments.

In some embodiments, an apparatus of a gNB 105 may comprise memory. The memory may be configurable to store information related to the control signaling and/or configuration information. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the control signaling and/or configuration information. The apparatus may include a transceiver to transmit the control signaling and/or configuration information. The transceiver may transmit and/or receive other blocks, messages and/or other elements.

Some of the descriptions below may illustrate some or all of the concepts and techniques described herein in some cases, but embodiments are not limited by those descriptions. For instance, embodiments are not limited by the name, number, type, size, ordering, arrangement of elements (such as devices, operations, messages and/or other elements) in those descriptions. Although some of the elements in the in those descriptions may be included in a 3GPP standard, 3GPP LTE standard, NR standard, 5G standard and/or other standard, embodiments are not limited to usage of such elements that are included in standards.

In some embodiments, methods of adaptive CSI RS density selection and/or evaluation period selection for Radio Link Monitoring (RLM) and Beam Failure Detection (BFD) may be used.

In 5G NR, RLM and BFD are based on hypothetical Block Error Rate (BLER) estimation for the corresponding downlink (DL) control channel. The reference signals, which are Quasi-Co-Located (QCLed) with the DL control channel, are used to measure the hypothetical BLER. The reference signals can be Synchronization Signal Blocks (SSB) or Channel State Information Reference Signals (CSI-RS). In some embodiments, RLM/BFD CSI-RS can have two possible frequency densities based on RAN1 agreements: D={1, 3}, wherein D is the number of CSI-RS Resource Elements (REs) within one Resource Block (RB).

In some cases, including but not limited to cases of high frequency selective multi-path fading channels and when the Sub-Carrier Spacing (SCS) is high, the spacing of adjacent CSI-RS REs with low frequency density (D=1) can exceed the coherent band-with of the fading channels. This may lead to significant estimation accuracy degradation for RLM measurement and BFD measurement, especially in low Signal Interference Noise Ratio (SINR) conditions (e.g. scenarios for RLM out of sync detection).

In some embodiments, adaptive selection of the frequency density of RLMBFD CSI-RS REs may be used. The frequency density selection can be based on the SCS of the Band-Width Part (BWP) in which the CSI-RS resource is allocated. In some embodiments, the RLMBFD evaluation period may be adapted based on the selected CSI-RS frequency density as well as the SCS, so that more instantaneous measurements can be averaged in case low frequency density and high SCS are configured. This compensates the accuracy loss from instantaneous measurements.

In some cases, including but not limited to situations in which the multi-path fading channel is highly frequency selective (in other words, it has high delay spread) and when the SCS of CSI-RS resource is high, RLM/BFD measurement accuracy can be significantly degraded if the allocated CSI-RS has low density (D=1). That is because the spacing between adjacent CSI-RS REs can exceed the coherent bandwidth of the fading channel.

In some embodiments, adaptive selection of the frequency density D of RLMBFD CSI-RS resources may be used. For instance, a higher frequency density can be selected when the SCS is high, in some cases. In a non-limiting example, the table below (which may be referred to as Table 1) shows examples of how the selection can be done for sub-6 Ghz bands. In some embodiments, the sub-6 GHz bands may be referred to as "F1 bands," although the scope of embodiments is not limited in this respect. Table 1 illustrates non-limiting examples of SCS and RLMBFD CSI-RS frequency density mapping in sub-6 Ghz bands.

| SCS | D (CSI-RS density) |
|---|---|
| 15 kHz | 1 |
| 30 kHz | 3 |
| 60 kHz | 3 |

In another non-limiting example, the table below (which may be referred to as Table 2) shows examples of how the selection can be done for mmWave bands. In some embodiments, the mmWave bands may be referred to as "F2 bands," although the scope of embodiments is not limited in this respect. Table 2 illustrates non-limiting examples of SCS and RLMBFD CSI-RS frequency density mapping in mmWave bands.

| SCS | D (CSI-RS density) |
|---|---|
| 60 kHz | 1 |
| 120 kHz | 1 |
| 240 kHz | 3 |

In should be noted that, in some cases, the selection can be also depending on the communications bands because the fading channel delay spread in mmWave bands can be shorter than that of sub-6 Ghz bands due to shorter communication distance in mmWave bands.

In some embodiments, a frequency density (D) of Channel State Information Reference Signals (CSI-RS) can be adaptively selected for Radio Link Monitoring (RLM) or Beam Failure Detection (BFD). In some embodiments, the selection can be based on the Sub-Carrier-Spacing (SCS) of the CSI-RS. In some embodiments, the selection can be based on RF bands in which the RLM/BFD CSI-RS is transmitted. In some embodiments, the RLMBFD evaluation period may be adapted based on the selected CSI-RS density, SCS and communication bands (mmWave or sub 6 Ghz), so that more instantaneous measurements can be averaged for RLMBFD in case of low density D and high SCS are configured at the same time, which compensates the accuracy loss from instantaneous measurements.

In some embodiments, the RLM or BFD evaluation period can be determined by the SCS of RLMBFD CSI-RS. In some embodiments, the RLM or BFD evaluation period can be determined by the frequency density of RLMBFD CSI-RS. In some embodiments, the RLM or BFD evaluation period can determined by the RF bands in which RLMBFD CSI-RS is transmitted. In some embodiments, the RLM or BFD evaluation period can be jointly determined by two or more of the above (and/or other(s)).

In some embodiments, the RLM or BFD evaluation period may be based at least partly on the SCS of RLM/BFD CSI-RS. In some embodiments, the RLM or BFD evaluation period may be based at least partly on the frequency density of RLM/BFD CSI-RS. In some embodiments, the RLM or BFD evaluation period may be based at least partly on the RF bands in which RLM/BFD CSI-RS is transmitted. In some embodiments, the RLM or BFD evaluation period may be based at least partly on two or more of the above (and/or other(s)).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
at least one processor, wherein the at least one processor is configured to cause a user equipment (UE) to:
receive configuration information to configure the UE with a plurality of channel state information reference signal (CSI-RS) resource sets, each CSI-RS resource set including a plurality of CSI-RS resources, wherein one of the CSI-RS resource sets is allocated for CSI based beam failure detection (BFD);
determine, based on a sub-carrier spacing (SCS) of a bandwidth part (BWP), a frequency density of the CSI-RS resources in the BWP in terms of a number of resource elements (REs) per resource block (RB);
determine, based on the frequency density of the CSI-RS resources, an evaluation period for the CSI-RS based BFD, wherein the evaluation period is longer for higher frequency densities and the evaluation period is shorter for lower frequency densities;
perform the CSI-RS based BFD, wherein performing the CSI-RS based BFD comprises:
determining a downlink radio link quality over a time period based on reception of CSI-RSs in the CSI-RS resource set allocated for the CSI based BFD during the evaluation period; and
determining that a beam failure has occurred when the downlink radio quality over the time period becomes worse than a threshold; and
encode, for transmission to a Next Generation Node-B (gNB), control signaling that indicates that the beam failure has occurred.

2. The apparatus according to claim 1, wherein the at least one processor is further configured to:
determine an M-BFD parameter based on the frequency density of the CSI-RS resources, wherein the processing circuitry is configured to determine the M-BFD parameter as 10 when the frequency density of the CSI-RS resources is three REs per RB;
determine the evaluation period based further on:
the M-BFD parameter, whether the IMP is in a sub-6 GHz frequency band or in a millimeter wave (mmWave) frequency band,
a periodicity of the CSI-RS resources,
whether discontinuous reception (DRX) is configured, and a DRX duty cycle.

3. The apparatus according to claim 2, wherein the at least one processor is further configured to:
if the BWP is in a sub-6 GHz frequency band, determine the evaluation period as:
if the DRX is not configured, a maximum of:
50 milliseconds (msec); and
a product of the M-BFD parameter, a P parameter and the periodicity of the CSI-RS resources,
if the DRX is configured, and if the DRX cycle is less than or equal to 320 msec, a maximum of:
50 msec; and a product of 1.5, the M-BFD parameter, the P parameter, and another term, wherein the other term is equal to a maximum of: the DRX cycle and the periodicity of the CSI-RS resources,
if the DRX is configured, and if the DRX cycle is greater than 320 msec: a product of the M-BFD parameter, the P parameter, and the DRX cycle.

4. The apparatus according to claim 2, wherein the at least one processor is further configured to:
if the BWP is in an mmWave frequency band, determine the evaluation period as:
if the DRX is not configured, a maximum of:
50 milliseconds (msec); and
a product of the M-BFD parameter, a P parameter, an N parameter, and the periodicity of the CSI-RS resources,
if the DRX is configured, and if the DRX cycle is less than or equal to 320 msec, a maximum of:
50 msec; and
a product of 1.5, the M-BFD parameter, the P parameter, the N parameter, and another term, wherein the other term is equal to a maximum of: the DRX cycle and the periodicity of the CSI-RS resources,
if the DRX is configured, and if the DRX cycle is greater than 320 msec: a product of the M-BFD parameter, the P parameter, the N parameter and the DRX cycle.

5. The apparatus according to claim 1, wherein:
the configuration information indicates one or more beam identifiers for multiple beams for the CSI-RSs, and
the processing circuitry is further configured to determine, as part of the CSI based BFD, which of the beams has failed based on the received CSI-RSs.

6. The apparatus according to claim 1, wherein the at least one processor is further configured to:
adapt the evaluation period to enable an increase in a number of measurements of the downlink radio quality when the frequency density of the CSI-RS resources decreases or when the SCS increases.

7. The apparatus according to claim 1, wherein the at least one processor is further configured to:
determine the frequency density of the CSI-RS resources as one of:
one RE per RB, and
three REs per RB.

8. The apparatus according to claim 1, wherein the at least one processor is further configured to:
further determine the frequency density of the CSI-RS resources based on whether the BWP is in a sub-6 GHz frequency band or in a millimeter wave (mmWave) frequency band,
wherein the processing circuitry is configured to:
if the BWP is in a sub-6 GHz frequency band, determine the frequency density of the CSI-RS resources based on a first predetermined mapping between the frequency density of the CSI-RS resources and the SCS of the BWP; and
if the BWP is in an mmWave frequency band, determine the frequency density of the CSI-RS resources based on a second predetermined mapping between the frequency density of the CSI-RS resources and the SCS of the BWP.

9. The apparatus according to claim 8, wherein:
for the first predetermined mapping:
a value of 15 kHz for the SCS of the BWP corresponds to a frequency density of one RE per RB,
a value of 30 kHz for the SCS of the BWP corresponds to a frequency density of three REs per RB, and
a value of 60 kHz for the SCS of the BWP corresponds to a frequency density of three REs per RB,
for the second predetermined mapping:
a value of 60 kHz for the SCS of the BWP corresponds to a frequency density of one RE per RB,
a value of 120 kHz for the SCS of the BWP corresponds to a frequency density of one RE per RB, and
a value of 240 kHz for the SCS of the BWP corresponds to a frequency density of three REs per RB.

10. The apparatus according to claim 1, wherein the threshold is based on a value of the downlink radio quality for unreliable reception that corresponds to a target block error rate (BLER) for a hypothetical physical downlink control channel (PDCCH) transmission.

11. The apparatus according to claim 10, wherein the at least one processor is further configured to:
derive the threshold based on one or more parameters of the hypothetical PDCCH transmission that includes one or more of:
a value of downlink control information (DCI) format equal to 0 or 1,
a ratio of hypothetical PDCCH resource element (RE) energy to average CSI-RS RE energy equal to 0 dB, and
a value of SCS equal to the SCS of the BWP.

12. The apparatus according to claim 1, wherein the at least one processor is further configured to:
determine the frequency density of the CSI-RS resources based on a non-decreasing relationship with the SCS,
wherein when a first SCS is greater than a second SCS, a first frequency density for the first SCS is greater than or equal to a second frequency density for the second SCS.

13. The apparatus according to claim 1, wherein:
the SCS of the BWP is preconfigured, or
the processing circuitry is further configured to decode control signaling from the gNB that indicates the SCS of the BWP.

14. The apparatus according to claim 1, wherein the UE is arranged to operate in accordance with a new radio (NR) protocol.

15. The apparatus according to claim 1, wherein:
the apparatus includes a transceiver to receive the configuration information,
the processing circuitry includes a baseband processor to decode the configuration information.

16. A non-transitory computer-readable storage medium that stores instructions for execution by processing circuitry of a Next Generation Node-B (gNB), the operations to configure the processing circuitry to:
determine a frequency density of channel state information reference signals (CSI-RSs) to be transmitted in a bandwidth part (BWP), wherein the frequency density of the CSI-RSs is adapted based on a configurable sub-carrier spacing (SCS) for the MVP, wherein determining the frequency density of the CSI-RSs to be transmitted in the BWP comprises:
if the BWP is in a sub-6 GHz frequency band, determining the frequency density of the CSI-RSs in terms of a number of resource elements (REs) per resource block (RB) based on a non-decreasing first mapping between the frequency density of the CSI-RSs and the SCS of the BWP and configuring the SCS of the BWP as one of: 15, 30, and 60 kHz, wherein for the first mapping:

a value of 15 kHz corresponds to a frequency density of one RE per RB, a value of 30 kHz for the SCS of the BWP corresponds to a frequency density of three REs per RB, and a value of 60 kHz for the SCS of the BWP corresponds to a frequency density of three REs per RB, and if the BWP is in a mmWave frequency band, determining the frequency density of the CSI-RSs in terms of a number of REs per RB based on a non-decreasing second mapping between the frequency density of the CSI-RSs and the SCS of the BWP and configuring the SCS of the BWP as one of: 60, 120, and 240 kHz, wherein for the second mapping:

a value of 60 kHz for the SCS of the BWP corresponds to a frequency density of one RE per RB, a value of 120 kHz for the SCS of the BWP corresponds to a frequency density of one RE per RB, and a value of 240 kHz for the SCS of the BWP corresponds to a frequency density of three REs per RB; and encode the CSI-RSs for transmission in accordance with the determined frequency density of the CSI-RSs.

17. An apparatus comprising:

at least one processor, configured to cause a user equipment (UE) to:

determine a frequency density of channel state information reference signals (CSI-RSs) in a bandwidth part (BWP) based on:

whether the BWP is in a sub-6 GHz frequency band or in a millimeter wave (mmWave) frequency band, and a sub-carrier spacing (SCS) of the BWP;

determine, based on the frequency density of the CSI-RSs, an evaluation period for CSI-RS based beam failure detection (BFD); and adapt the evaluation period to enable an increase in a number of measurements of the downlink radio quality when a frequency density of the CSI-RSs decreases or when the SCS increases.

18. The apparatus according to claim 17, the processing circuitry further configured to:

determine the frequency density of the CSI-RSs in the BWP as one of:

one RE per RB, and three REs per RB.

19. The apparatus according to claim 17, wherein the at least one processor is further configured to:

perform the CSI-RS based BFD, wherein performing the CSI-RS based BFD comprises:

determining a downlink radio link quality over a time period based on reception of CSI-RSs in the CSI-RS resource set allocated for the CS1 based BFD during the evaluation period; and determining that a beam failure has occurred when the downlink radio quality over the time period becomes worse than a threshold.

20. The apparatus according to claim 19, wherein the at least one processor is further configured to:

encode, for transmission to a Next Generation Node-B (gNB), control signaling that indicates that the beam failure has occurred.

* * * * *